Feb. 7, 1933.  C. O. HANSON  1,896,707
CLUTCH
Filed May 13, 1931
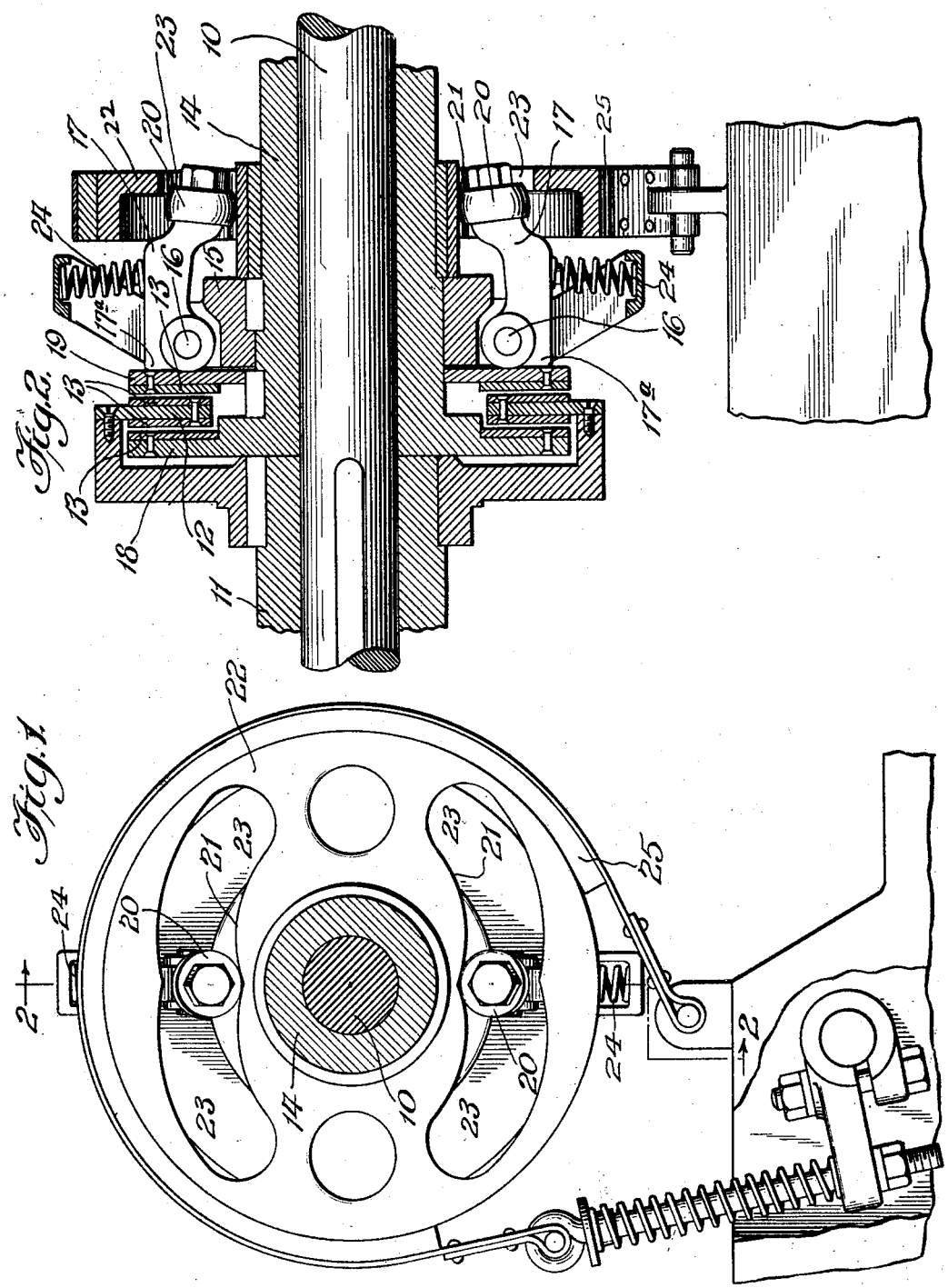
Inventor
Clifford O. Hanson,
By Dyrenforth, Lee, Chritton & Wiles, Attys.

Patented Feb. 7, 1933

1,896,707

UNITED STATES PATENT OFFICE

CLIFFORD O. HANSON, OF TIFFIN, OHIO, ASSIGNOR TO THE HANSON CLUTCH & MACHINERY CO., OF TIFFIN, OHIO, A CORPORATION OF OHIO

CLUTCH

Application filed May 13, 1931. Serial No. 537,142.

This invention relates to improvements in clutches and, more especially, a friction clutch.

The invention is designed for use in connection with practically any kind of friction clutch employing a driving member and a driven member, each carrying a part adapted for frictional engagement with the other. Such parts, for example, may be discs, cones or other surfaces. For convenience in description, I shall hereafter refer to such parts as "frictional parts".

Among the features of my invention is the provision of a clutch that is simple in construction and operation and yet strong, durable and efficient.

Other features and advantages of my invention will appear more fully as I proceed with my specification.

In that form of device embodying the features of my invention shown in the accompanying drawing—

Figure 1 is a view in end elevation: and Fig. 2 is a view taken as indicated by the line 2—2 of Fig. 1.

As shown in the drawing, 10 may indicate a shaft upon which is non-rotatably mounted a driven member 11 carrying a friction disc 12 preferably lined on each face with suitable friction-resistant material 13. Numeral 14 indicates a driving member or sleeve rotatably mounted on the shaft 10 with any suitable means (not shown) for driving the same. Numeral 15 indicates a collar on the sleeve 14 having pivotally mounted thereon at 16 the two bell cranks 17, 17. The inner end of the sleeve 14 is enlarged to form the friction disc 18 provided with suitable lining 13 above described. Numeral 19 indicates a friction disc slidably and non-rotatably mounted on the sleeve 14, also provided with suitable lining material 13. The friction disc 12 on the driven member lies between the friction discs 18 and 19 carried by the driving member and is adapted to be gripped therebetween when the clutch is thrown in. In Fig. 2, the clutch is shown out and it will be seen that the friction disc 12 is not engaged by the other discs and, consequently, the clutch is out or the driven member is free.

I shall now describe the means for moving the frictional parts of the device into frictional engagement. The bell cranks 17 carry rollers 20 resting on the cam surfaces 21 of the cam wheel or control member 22. It will be seen that this member is provided with curved slots or openings 23 in which the rollers 20 on the bell cranks 17 operate. The inner surfaces of these openings, as indicated by 21, form cam surfaces upon which the rollers 20 move. It will be seen that when the rollers 20 are in the position shown in Fig. 1, they are closest to the shaft 10. The control member 22 is rotatably mounted on the sleeve or driving member 14. When the wheel 22 is rotated on the sleeve, the rollers 20 move outwardly in the openings 23 resting on the cam surfaces 21 which moves them outwardly or away from the shaft 10, thus rocking them on the pivots 16. This rocking causes the shoulders 17$^a$ on the bell cranks to press against the disc 19 forcing it toward the disc 12, thus gripping the disc 12 between the discs 18 and 19. After friction disc 19 has come into firm engagement with the disc 12, further movement of the bell crank 16 pulls the entire sleeve 14 rearwardly, thus bringing the disc 18 into engagement with disc 12. Compression springs 24 operate to yieldingly urge the bell cranks inwardly tending to release the clutch.

The control member or wheel 22 is surrounded by a band brake 25 which may be tightened to impose a drag upon the rotation of the wheel 22. In the operation of the device, the springs 24 normally hold the clutch out so that when the sleeve 14 is rotated, it and the parts carried by it will rotate, but the disc 12 on the driven member will be free, thus allowing the driven member 11 and the shaft 10 to remain stationary. When it is desired to throw in or engage the clutch, the band brake 25 is slightly tightened to impose a drag on the control member 22. This causes a rotation of the control member 22 on the sleeve 14, thus moving the cam rollers 20 outwardly, as above described, which action serves to move the friction discs 18 and 19 together to grip the friction disc 12 therebetween to cause it to rotate with the sleeve 14 and thus rotate the sleeve 11 and shaft 10.

It is to be noted that all the time that the clutch is in, the control member 22 continues to rotate. That is, the band brake 25 is never tightened enough to completely stop rotation of the wheel or member 22. The brake merely imposes a drag upon it so that the cam wheels 20 are forced out enough to cause the discs 18 and 19 to grip the disc 12 tightly enough to rotate the driven member. After this much drag is put upon the wheel 22, the wheel is allowed to slip under the brake 25. The parts are so arranged and the bell cranks 17 have sufficient leverage so that no undue wear or harm results from such slippage.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A clutch including a driven member with a friction disc; a driving member with a friction disc; a bell crank on the driving member, movement of said bell crank adapted to move the discs into frictional engagement; a control member rotatably mounted on the driving member and having a cam surface; a part on the bell crank in engagement with said cam surface; and means for imposing a drag on the control member.

2. Apparatus as set forth in claim 1, in which the control member comprises a wheel.

3. Apparatus as set forth in claim 1, in which said control member comprises a wheel rotatably mounted on the driving member and having a slotted cam surface within its periphery.

4. Apparatus as set forth in claim 1, in which the means for imposing a drag on the control member comprises a brake band.

In witness whereof, I have hereunto set my hand this 6th day of May, 1931.

CLIFFORD O. HANSON.